US011727366B1

(12) United States Patent
Cutler et al.

(10) Patent No.: US 11,727,366 B1
(45) Date of Patent: Aug. 15, 2023

(54) SYSTEMS AND METHODS FOR VERIFICATION OF BLOCKCHAIN TRANSACTIONS

(71) Applicant: Blocknative Corporation, Boulder, CO (US)

(72) Inventors: Matthew Cutler, Tiburon, CA (US); Chris Meisl, Victor, ID (US); Ryan Angilly, Denver, CO (US); Niel Robertson, Encino, CA (US)

(73) Assignee: BlockNative Corporation, Boulder, CO (US)

( * ) Notice: Subject to any disclaimer, the term of this patent is extended or adjusted under 35 U.S.C. 154(b) by 302 days.

(21) Appl. No.: 16/795,265

(22) Filed: Feb. 19, 2020

Related U.S. Application Data

(60) Provisional application No. 62/808,091, filed on Feb. 20, 2019.

(51) Int. Cl.
*G06Q 20/40* (2012.01)
*H04L 9/06* (2006.01)
*G06Q 20/06* (2012.01)

(52) U.S. Cl.
CPC ....... *G06Q 20/0658* (2013.01); *G06Q 20/405* (2013.01); *H04L 9/0637* (2013.01); *G06Q 2220/00* (2013.01)

(58) Field of Classification Search
CPC ............. G06Q 20/0658; G06Q 20/405; G06Q 2220/00; H04L 9/0637
See application file for complete search history.

(56) References Cited

U.S. PATENT DOCUMENTS

| 10,666,424 B1* | 5/2020 | Rutley | H04L 63/1416 |
| 11,100,743 B1* | 8/2021 | Sealy | G07C 13/00 |
| 11,126,978 B1* | 9/2021 | Bialzak | G06Q 20/108 |
| 2006/0206419 A1* | 9/2006 | Rosti | G06Q 40/02 |
| | | | 705/39 |

(Continued)

FOREIGN PATENT DOCUMENTS

| CA | 3051287 A1 * | 4/2019 | G06F 16/9024 |
| WO | WO-2014130733 A1 * | 8/2014 | G06F 16/219 |
| WO | WO-2019036804 A1 * | 2/2019 | G06F 9/54 |

OTHER PUBLICATIONS

"Predicting the confirmation time of Bitcoin transactions", D.T. Koops, University of Amsterdam, Oct. 23, 2018 (Year: 2018).*

*Primary Examiner* — Neha Patel
*Assistant Examiner* — Duan Zhang
(74) *Attorney, Agent, or Firm* — Cooley LLP

(57) ABSTRACT

In some embodiments, an apparatus includes a memory of a dispatch server and a processor of the dispatch server communicatively coupled to the memory. The processor is configured to receive an indication of a blockchain transaction to monitor; the blockchain transaction having not yet been finalized by a blockchain. The processor is configured to store the indication of the blockchain transaction in a state monitor cache communicatively coupled to the blockchain such that a state monitor queries the blockchain for a status of the blockchain transaction based on the indication of the blockchain transaction being stored within the state monitor cache. The processor is configured to provide the status of the blockchain transaction to a user in response to receiving an indication of the status of the blockchain transaction.

20 Claims, 22 Drawing Sheets

(56) References Cited

U.S. PATENT DOCUMENTS

| | | | |
|---|---|---|---|
| 2009/0249129 A1* | 10/2009 | Femia | G06N 7/01 |
| | | | 714/E11.2 |
| 2009/0265273 A1* | 10/2009 | Guntupalli | G06Q 20/40 |
| | | | 705/44 |
| 2015/0317349 A1* | 11/2015 | Chao | G06F 16/278 |
| | | | 707/615 |
| 2018/0075536 A1* | 3/2018 | Jayaram | G06Q 20/26 |
| 2019/0378139 A1* | 12/2019 | Stribady | H04L 9/3239 |
| 2020/0034833 A1* | 1/2020 | Collen | G06Q 50/06 |
| 2020/0267215 A1* | 8/2020 | Kim | H04L 67/10 |

* cited by examiner

FIG. 7

| Category | Event | Category Code | Event Code |
|---|---|---|---|
| Initialization | Initialize failed | initialize | initFail |
| Initialization | Initialize Succeeded | initialize | initSuccess |
| On-boarding | Mobile blocked | onboard | |
| On-boarding | Browser not supported | onboard | browserFail |
| On-boarding | Wallet not installed | onboard | walletFail |
| On-boarding | Wallet login request | onboard | walletLogin |
| On-boarding | Wallet login failed | onboard | walletLoginFail |
| On-boarding | EIP 1102 Request (enable) | onboard | walletEnable |
| On-boarding | Wallet enable success | onboard | walletEnableSuccess |
| On-boarding | Wallet enable failed | onboard | walletEnableFail |
| On-boarding | Wallet network incorrect | onboard | networkFail |
| On-boarding | Wallet non-sufficient funds (NSF) | onboard | nsfFail |
| Preflight Active Transaction | Wallet not installed | activePreflight | walletFail |
| Preflight Active Transaction | Wallet login request | activePreflight | walletLogin |
| Preflight Active Transaction | Wallet login failed | activePreflight | walletLoginFail |
| Preflight Active Transaction | EIP 1102 Request | activePreflight | |
| Preflight Active Transaction | Wallet network incorrect | activePreflight | networkFail |
| Preflight Active Transaction | Wallet non-sufficient funds (NSF) | activePreflight | nsfFail |
| Preflight Active Transaction | Repeat transaction | activePreflight | txRepeat |
| Monitor Active Transaction | Transaction request awaiting confirmation | activeMonitor | txRequest |
| Monitor Active Transaction | Transaction sent/pending | activeMonitor | txSent |
| Monitor Active Transaction | Transaction send failed | activeMonitor | txSendFail |
| Monitor Active Transaction | Transaction in pool | activeMonitor | txPool |
| Monitor Active Transaction | Transaction confirmed | activeMonitor | txConfirmed |
| Monitor Active Transaction | Transaction finalized | activeMonitor | txFinalized |
| Monitor Active Transaction | Transaction failed | activeMonitor | txFail |
| Monitor Active Transaction | Transaction stalled | activeMonitor | txStall |
| Monitor Passive Transaction | 3rd Party Transaction confirmed | passiveMonitor | txConfirmed |
| Monitor Passive Transaction | 3rd Party Transaction finalized | passiveMonitor | txFinalized |
| Monitor Passive Transaction | Slow Network | passiveMonitor | slowNetwork |

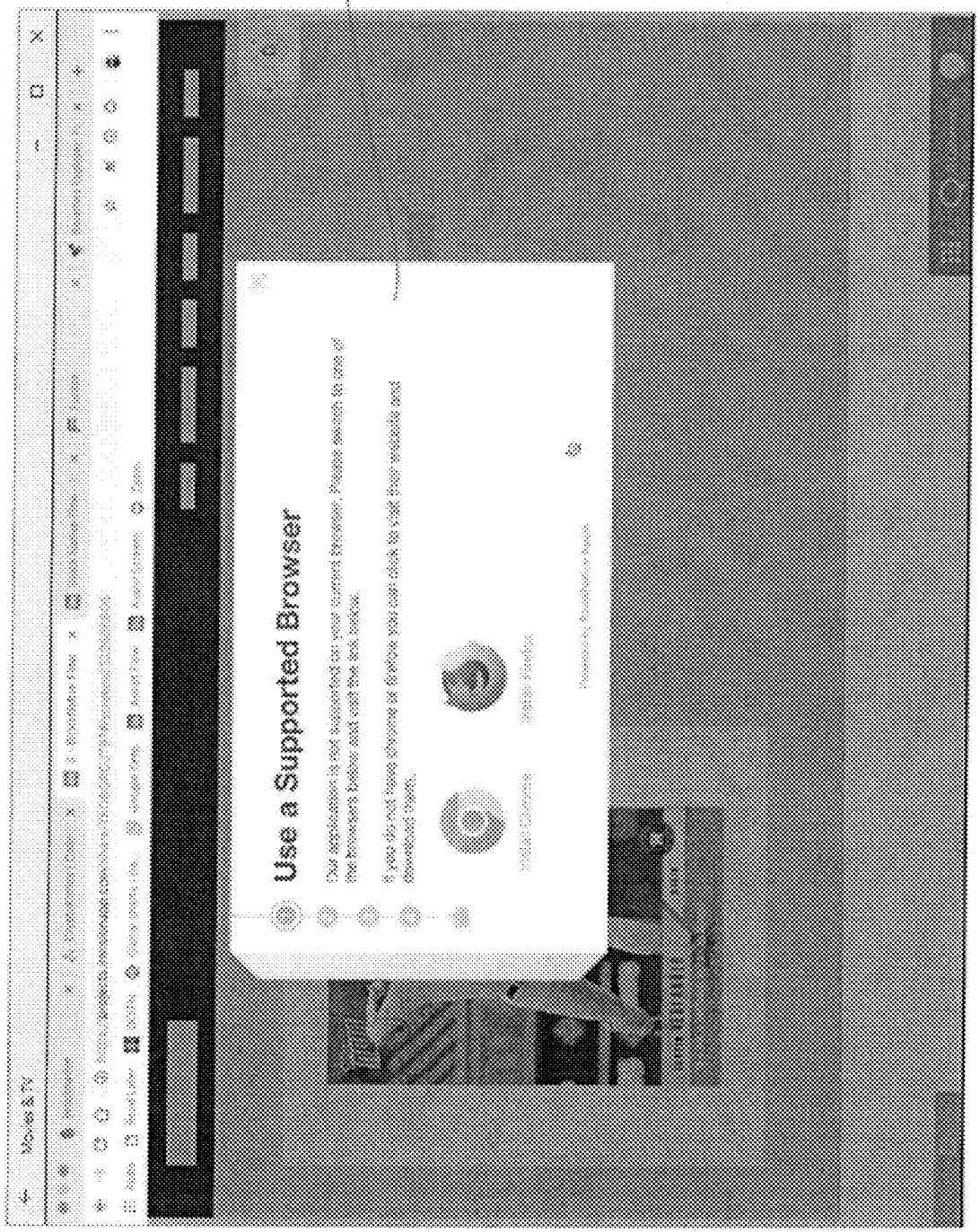

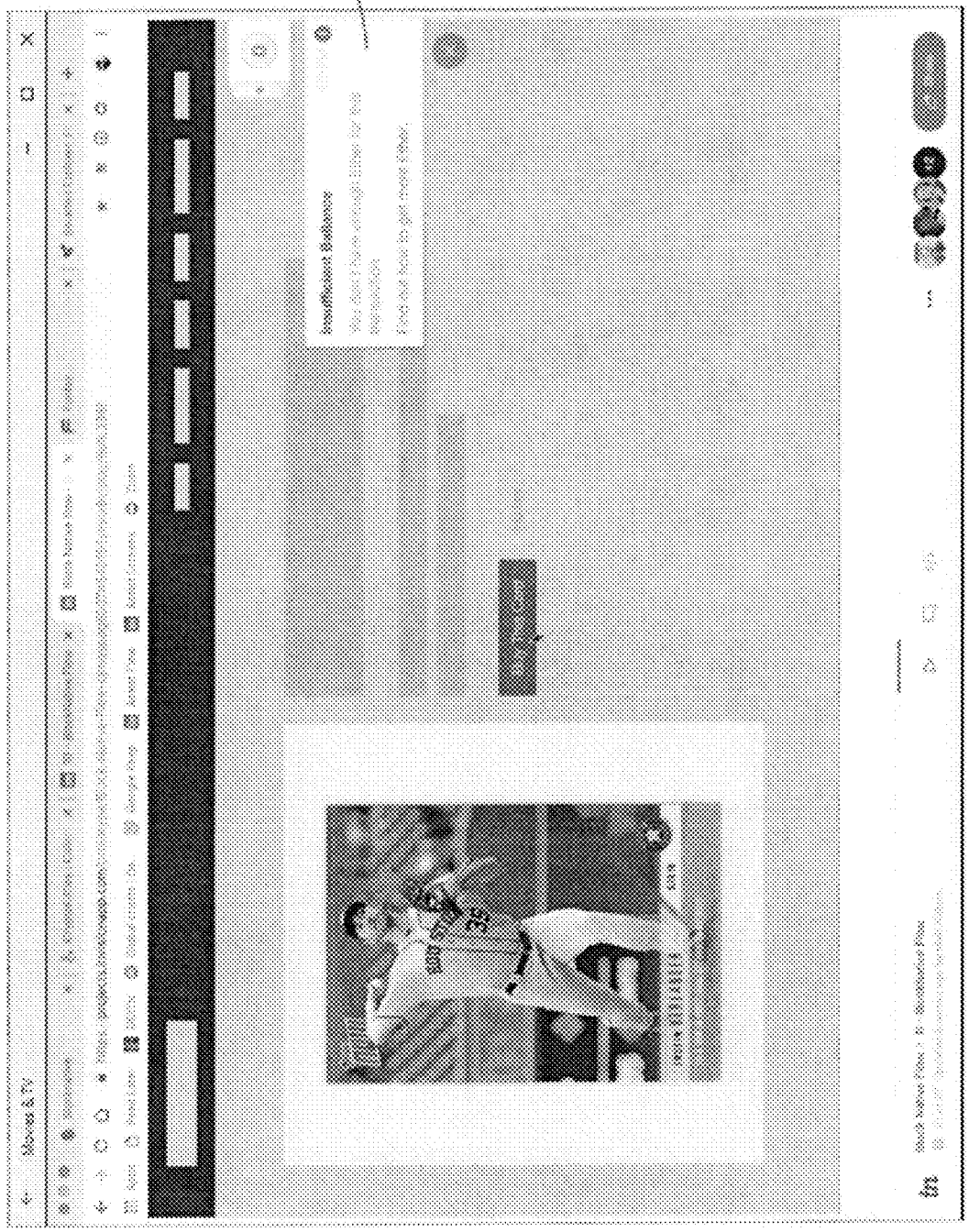

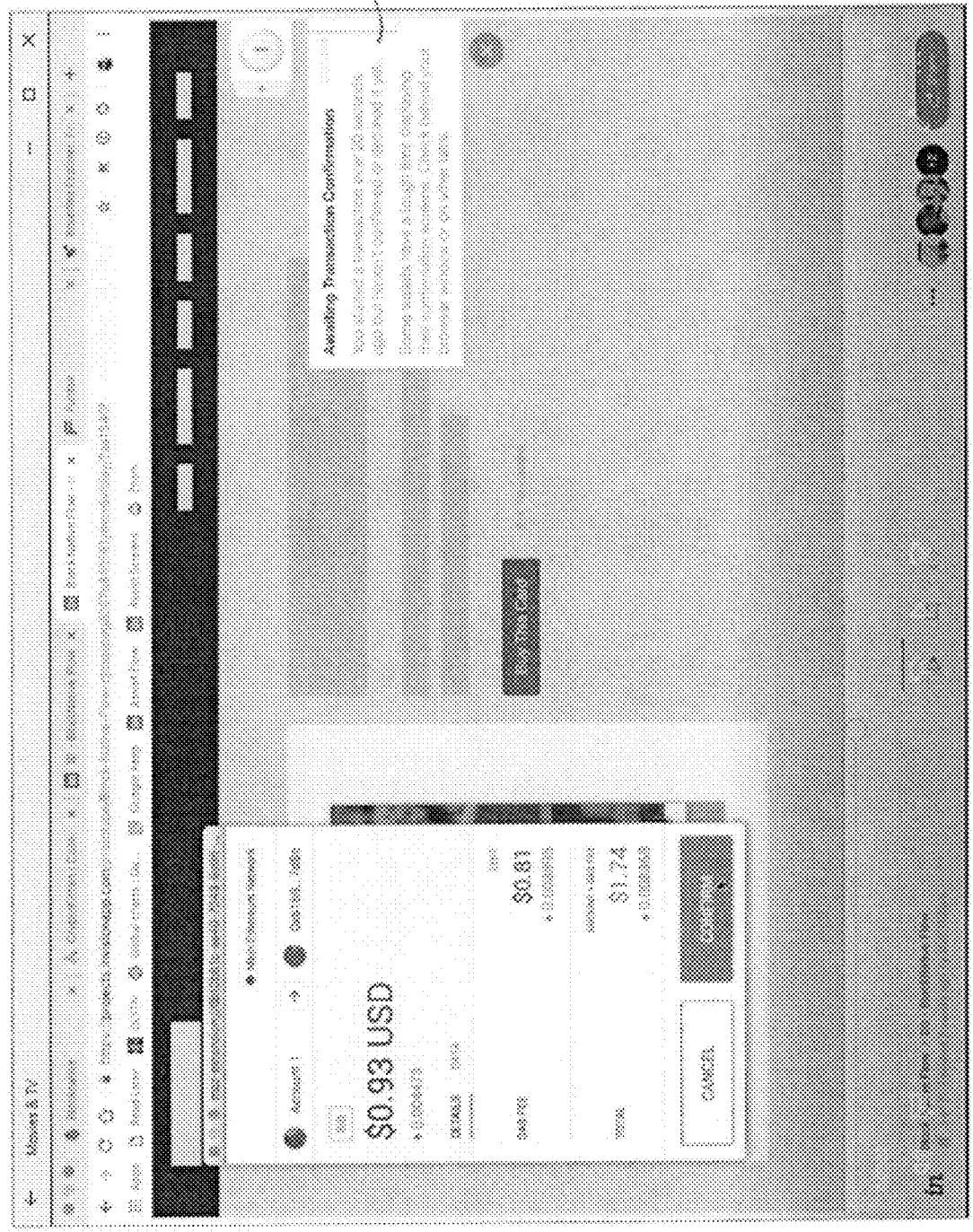

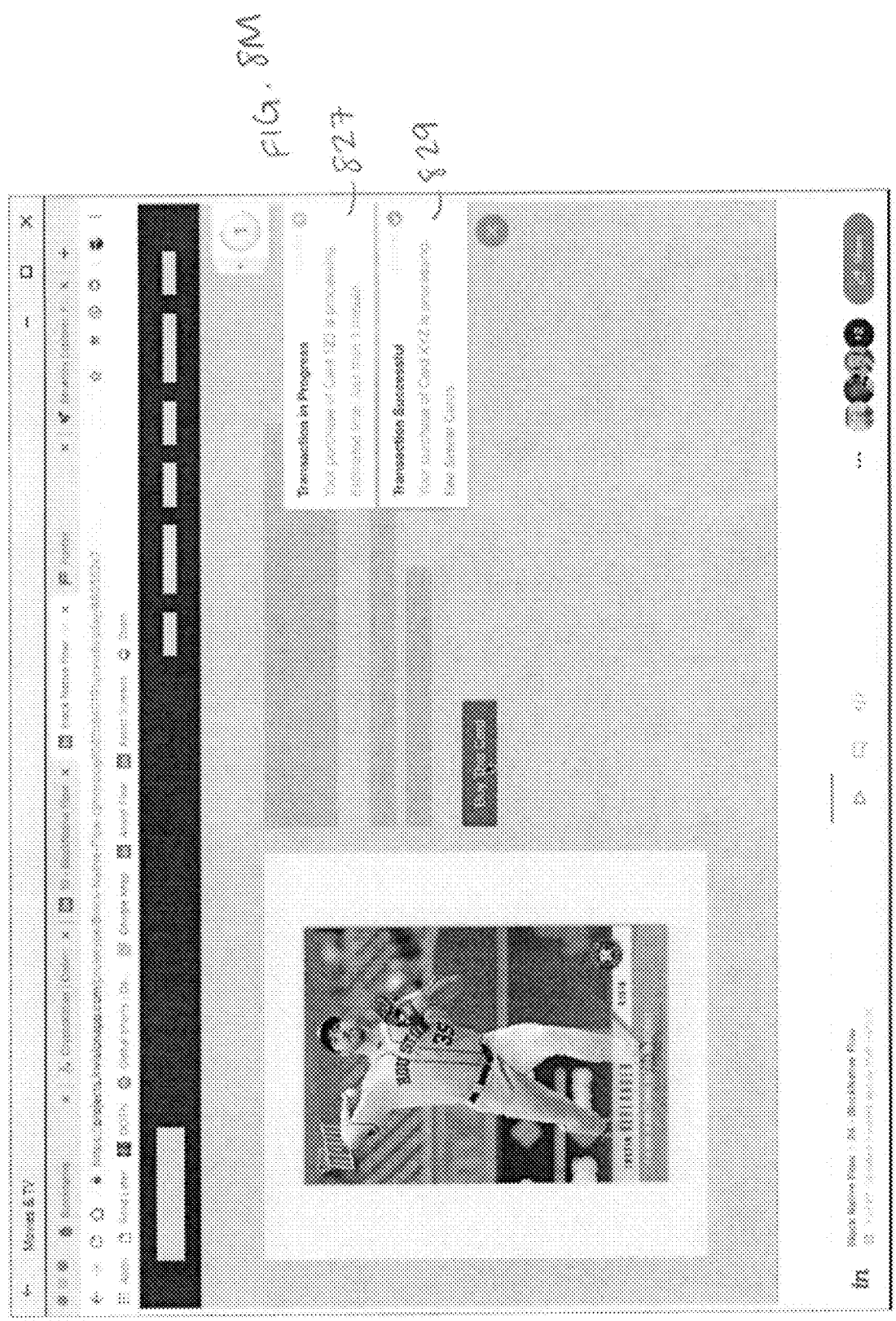

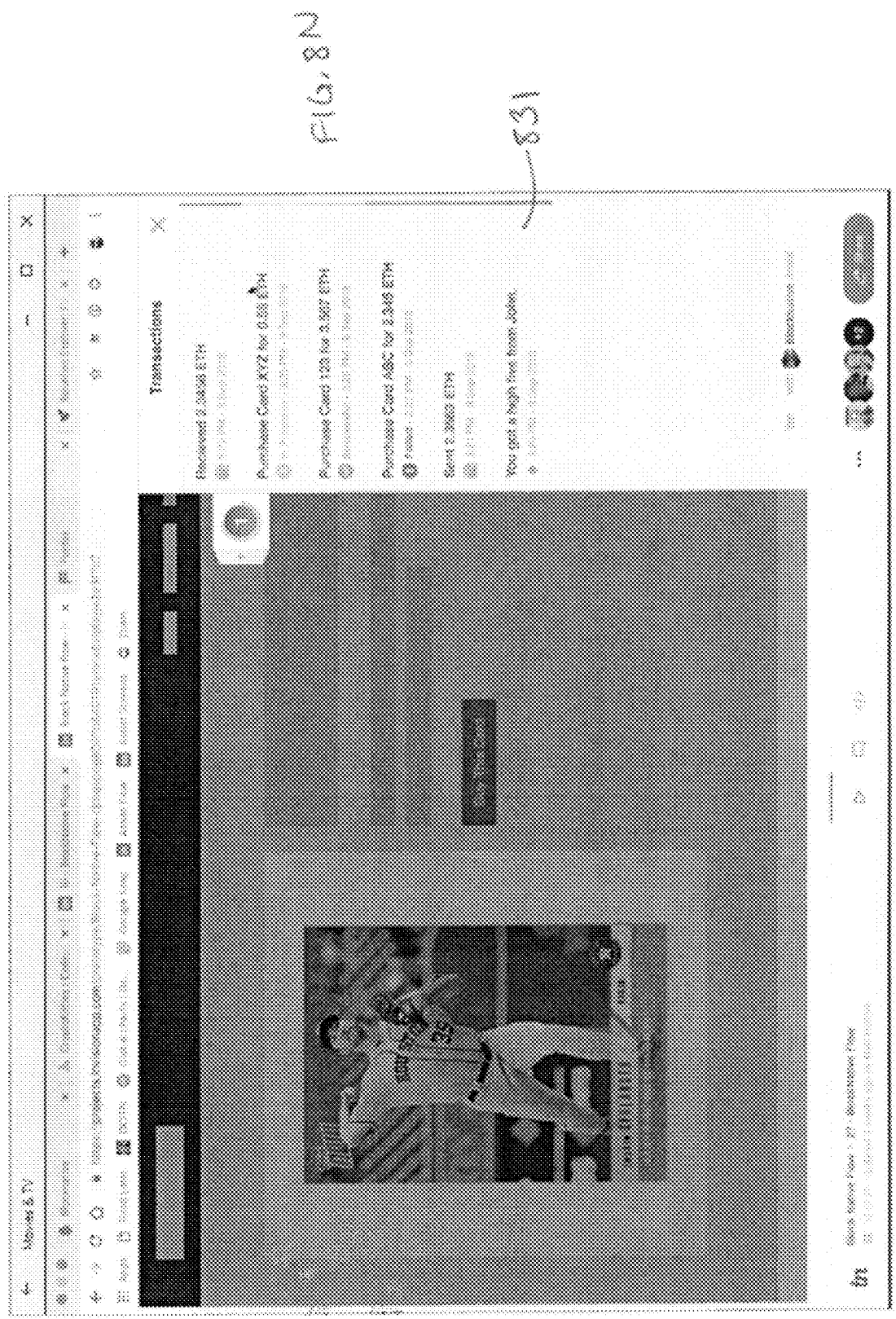

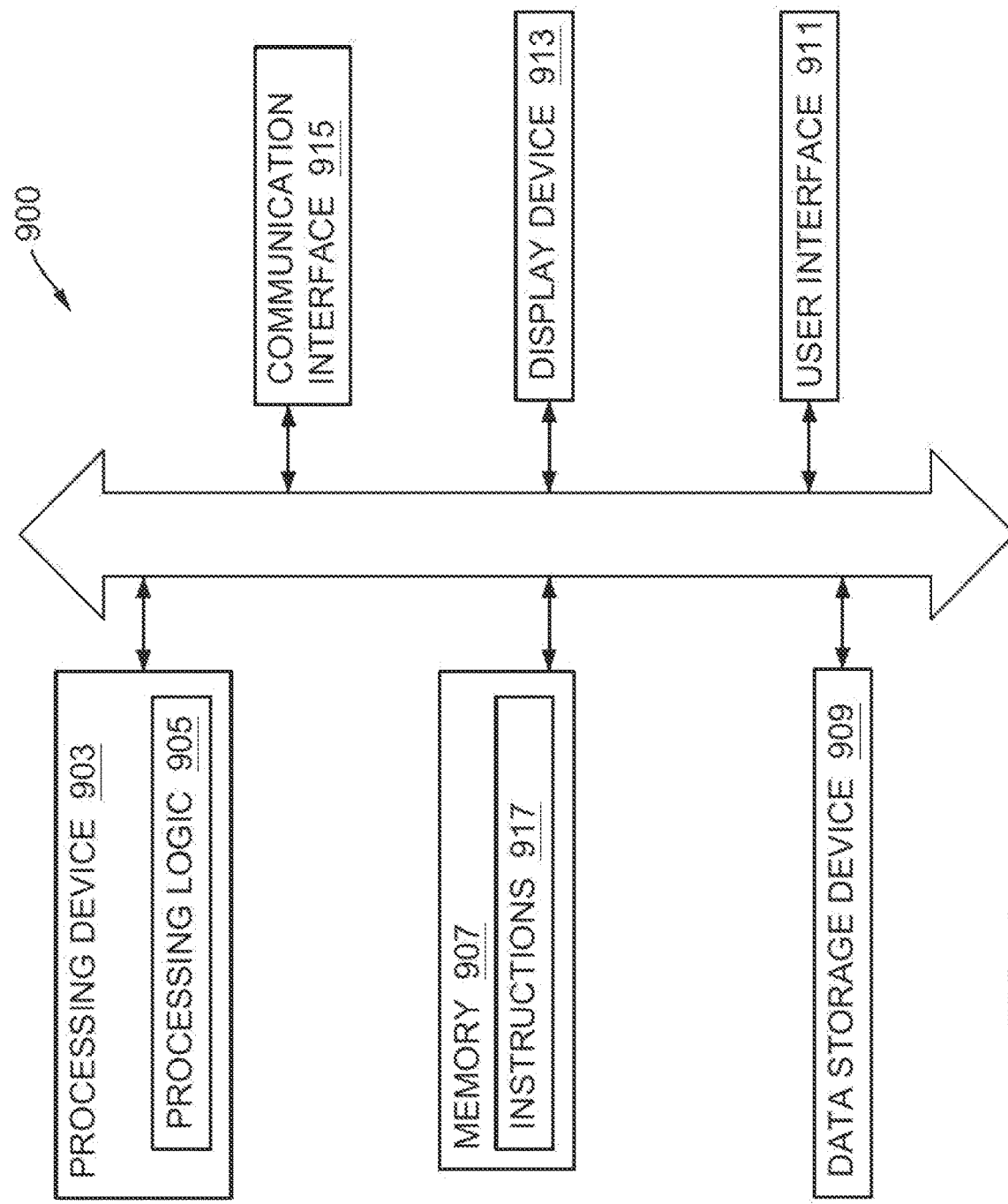

SYSTEMS AND METHODS FOR VERIFICATION OF BLOCKCHAIN TRANSACTIONS

CROSS-REFERENCE TO RELATED APPLICATIONS

This application claims priority to and the benefit of U.S. Provisional Patent Application No. 62/808,091, filed Feb. 20, 2019 and titled "Systems and Methods for Verification of Blockchain Transactions", which is incorporated herein by reference in its entirety.

TECHNICAL FIELD

The present disclosure relates to systems and methods that facilitate and verify blockchain transactions.

BACKGROUND

Development in blockchain technology has led to the proliferation of decentralized applications or Dapps. Dapps leverage and are built on existing blockchain technology.

For example, some Dapps may run on top of other cryptographic systems (e.g., CryptoKitties runs on Ethereum).

Existing Dapps are often difficult for novice users to navigate. For example, novice users may be unfamiliar with the processes for setting up and maintaining a cryptocurrency wallet, and may also be unaware of the different reasons why blockchain transactions may not be completed.

Further, conventional systems utilizing blockchains are unable to provide transparency into when a blockchain transaction is completed. In a blockchain a ledger of records are organized in blocks that are linked together. Transactions may be stored in a pool prior to being combined into a single block that is added to the blockchain. Existing systems are unable to provide visibility into the process by which transactions are approved, added to a pool, and then combined into a block of the blockchain.

SUMMARY

In some embodiments, an apparatus includes a memory of a dispatch server and a processor of the dispatch server communicatively coupled to the memory. The processor is configured to receive an indication of a blockchain transaction to monitor; the blockchain transaction having not yet been finalized by a blockchain. The processor is configured to store the indication of the blockchain transaction in a state monitor cache communicatively coupled to the blockchain such that a state monitor queries the blockchain for a status of the blockchain transaction based on the indication of the blockchain transaction being stored within the state monitor cache. The processor is configured to provide the status of the blockchain transaction to a user in response to receiving an indication of the status of the blockchain transaction.

DETAILED DESCRIPTION

Figure 1:
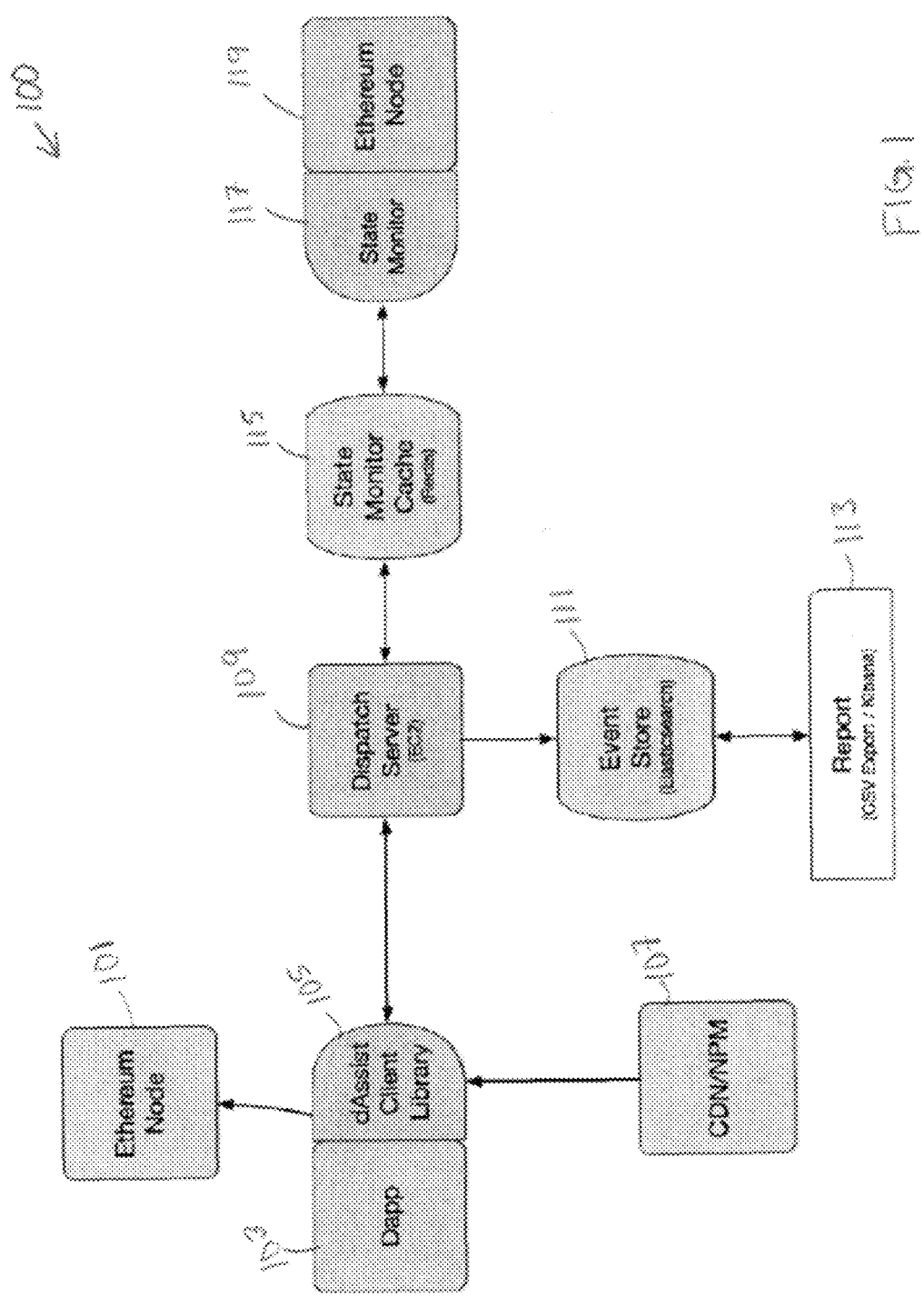
FIG. 1 illustrates an architecture diagram for a system in accordance with some embodiments of the present disclosure.

Disclosed are systems and methods for verification of blockchain transactions. In some embodiments, the described systems and methods may provide visibility into a blockchain and are capable of being used to verify blockchain transactions.

The disclosed systems and methods may be used by novice users to more successfully interact with a blockchain and the underlying cryptographic systems of a Dapp.

In some embodiments, the disclosed systems and methods may provide a user with improved understanding of smart contracts functions.

In some embodiments, the disclosed systems and methods may be utilized by a developer of a Dapp to detect intentions to transact and gain insight into transaction flow. Insight into the transaction flow may then be used to adjust or modify a Dapp or features thereof.

In some embodiments, a system includes a dispatch server communicatively coupled with a state monitor cache and a distributed application. The state monitor cache is communicatively coupled to a blockchain and configured to query the blockchain to receive status updates for a transaction specified by the dispatch server. In some embodiments, the dispatch server is configured to provide a user of the distributed application status information for the transaction based on the query.

In some embodiments, a method includes adding a transaction to a state monitor cache, querying a blockchain for a status update for the transaction, providing an update to a server system communicatively coupled to the state monitor cache based on a result of the status update, and removing the transaction from the state monitor cache when it is determined that the transaction is finalized on the blockchain (i.e., is part of a block on the blockchain).

In some embodiments, the disclosed systems and methods may include additional computer program code that is configured to be embedded into existing computer program code that is configured to generate and provide an application to a user. In some embodiments the application may be based on a blockchain environment (e.g., Ethereum, Bitcoin).

In some embodiments, the computer program code can be used to provide visibility into a user's transactions with a blockchain environment and/or distributed application built on the blockchain environment. In some embodiments, the disclosed systems may guide a user of the distributed application through using a supported browser, creating an account, creating a blockchain account, installing a wallet, logging into a wallet, connecting to the correct blockchain network, purchasing a cryptocurrency, providing a balance to a user, providing visibility into a failed transaction, providing visibility into a completed transaction and the like.

By monitoring the distributed application as well as the blockchain, in some embodiments, the disclosed systems and methods are able to provide insight to a distributed application developer as to why a user's transaction was not completed. Further, by monitoring the distributed application as well as the blockchain, the disclosed systems and methods are also able to provide a user with visibility into the transaction's interaction with the blockchain, such as when the transaction is added to a pool, when the transaction is written to a block, and the like.

Disclosed are systems and methods for setup/on-boarding and verification of blockchain transactions. A system may include a dispatch server communicatively coupled with a state monitor cache and a distributed application. In some embodiments, the state monitor cache may be communicatively coupled to a blockchain and configured to query the blockchain to receive status updates for a transaction specified by the dispatch server. The dispatch server may be configured to provide a user of the distributed application status information for the transaction based on the query.

In some embodiments, an apparatus includes a memory of a dispatch server and a processor of the dispatch server communicatively coupled to the memory. The processor is configured to receive an indication of a blockchain transaction to monitor; the blockchain transaction having not yet been finalized by a blockchain. The processor is configured to store the indication of the blockchain transaction in a state monitor cache communicatively coupled to the blockchain such that a state monitor queries the blockchain for a status of the blockchain transaction based on the indication of the blockchain transaction being stored within the state monitor cache. The processor is configured to provide the status of the blockchain transaction to a user in response to receiving an indication of the status of the blockchain transaction.

In some implementations, the processor is further configured to remove the indication of the blockchain transaction from the state monitor cache when the status of the blockchain transaction indicates that the blockchain transaction has been finalized. In some implementations, the state monitor is configured to periodically (e.g., at predefined intervals), sporadically, randomly and/or on-demand, query and/or interrogate the blockchain (or blockchain node) for the status of the blockchain transaction. In some implementations, the state monitor can subscribe to receive messages and/or status updates from the blockchain (or blockchain node). In such implementations, the state monitor can register with the blockchain node to passively receive messages and/or status updates associated with a blockchain transaction's state. For example, the state monitor can register with the blockchain node to receive updates on one or more blockchain transactions. When an update occurs to one of the monitored blockchain transactions, the blockchain node can send an update of the new status to the state monitor.

In some implementations, a method includes periodically retrieving, at a state monitor and from a state monitor cache, an indication of a blockchain transaction that is not yet finalized. The method further includes querying a blockchain for a status update of the transaction and storing the status update in the state monitor cache such that a dispatch server retrieves the status update and provides the status update to a user of a distributed application associated with the blockchain transaction. In some implementations, when the status update is that the blockchain transaction is finalized, the storing includes storing the status update such that the dispatch server removes the indication of the blockchain transaction from the state monitor cache.

FIG. 1 illustrates an architecture diagram for a system architecture 100 in accordance with some embodiments of the present disclosure. As illustrated in FIG. 1, a distributed application or Dapp 103 may be coupled to and/or executed by a blockchain node 101 (e.g., a compute device with a processor and a memory for executing a node that runs a distributed instance of a blockchain, such as, for example, an Ethereum node). The disclosed systems may include a client library 105, dispatch server 109, state monitor 117. In some embodiments, the disclosed systems may interface with third party services such as a state monitor cache 115, event store 111, and/or a content delivery network and/or package manager (CDN/NPM) 107.

As illustrated, the client library (e.g., Assist Client Library) 105 (e.g., a memory) may be coupled to the distributed application 103. Further, the client library 105 may be further configured to communicate with a dispatch server 109. In some embodiments, an application programming interface (API) may be used to communicatively couple the client library 105 with the dispatch server 109.

Figure 9D:
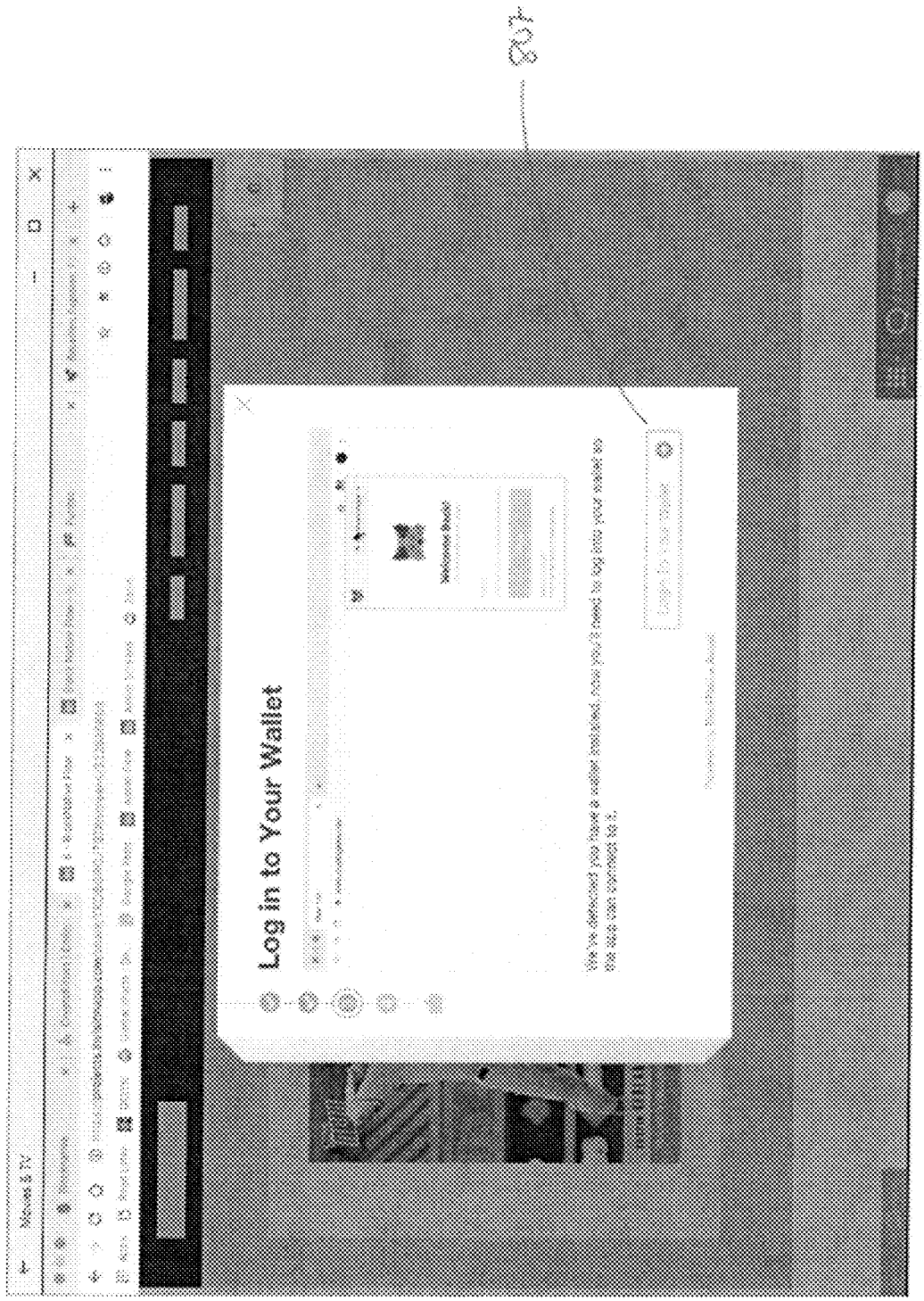
FIG. 9 illustrates a computer system diagram for an aspect of a computing system in accordance with some embodiments of the present disclosure.
Figure 33:
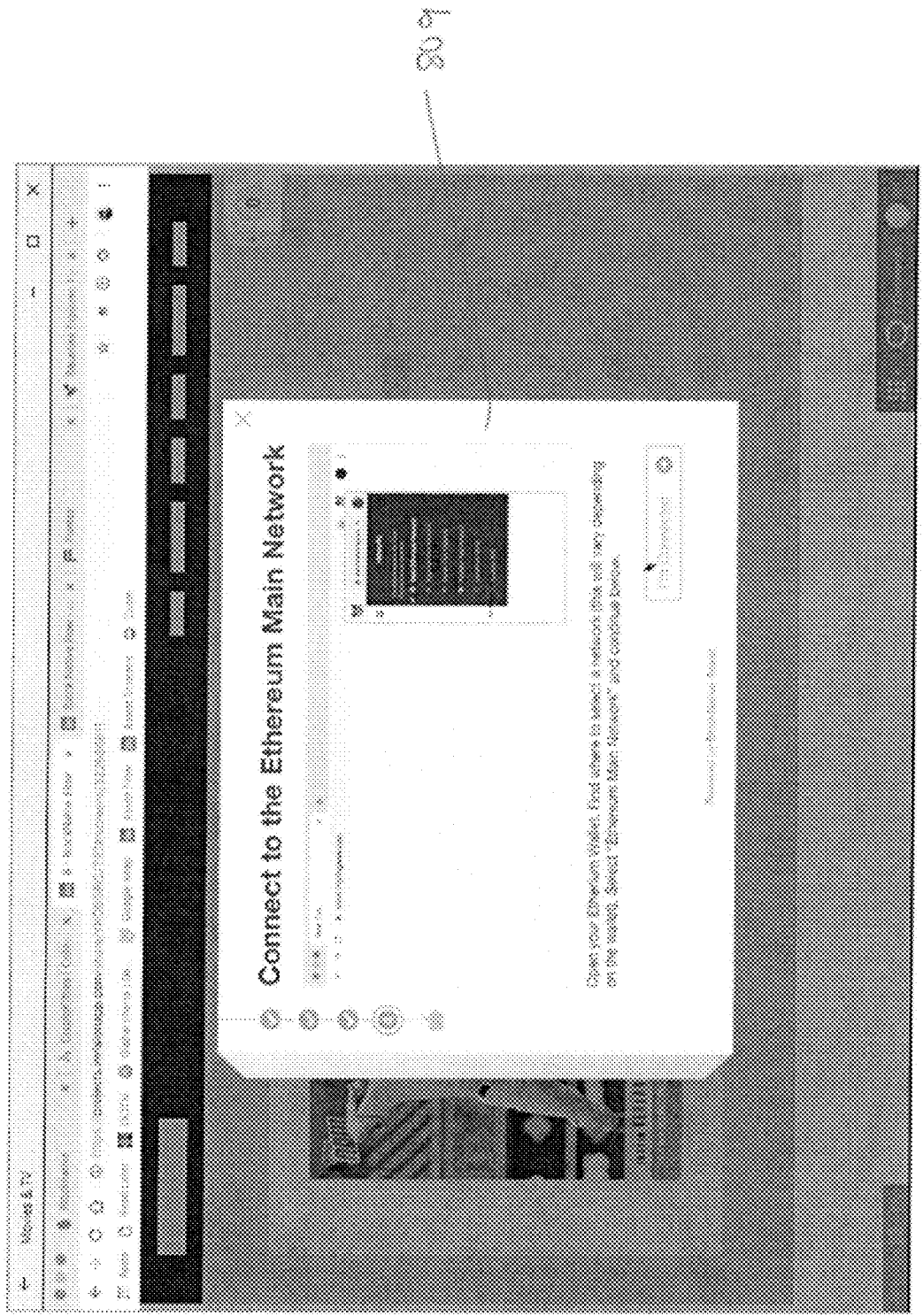

The dispatch server 109 can be a server and/or other compute device having a processor and a memory (e.g., similar to processing device 903 and memory 907 shown and described with respect to FIG. 9). The memory of the dispatch server 109 can store code to cause the processor of the dispatch server 109 to execute the functions of the dispatch server 109 as described herein. For example, the dispatch server 109 may be configured to communicate setup (on-boarding) and transaction information to a client, and log events for monitoring by a distributed application developer. In some embodiments, the dispatch server 109 (e.g., the processor of the dispatch server) may be configured to monitor transaction information across various distributed applications.

In some embodiments, the dispatch server 109 may be communicatively coupled to a state monitor cache 115 that is then coupled to a state monitor 117. The state monitor cache 115 can be a memory (e.g., similar to memory 907 shown and described with respect to FIG. 9) configured to store blockchain transactions to be monitored by the state monitor 117. The state monitor 117 can be a server and/or other compute device having a processor and a memory (e.g., similar to processing device 903 and memory 907 shown and described with respect to FIG. 9). The memory of the state monitor 117 can store code to cause the processor of the state monitor 117 to execute the functions of the state monitor 117 as described herein.

The dispatch server 109 may provide the state monitor cache 115 with a list of transactions to monitor (as determined and received from the distributed application 103 and/or the client library 105). Additionally, the dispatch server 109 may be configured to receive and/or read transaction state changes from the state monitor cache 115.

The state monitor cache 115 may then interface with the state monitor 117 such that the state monitor 117 queries the blockchain node 119 (e.g., a compute device with a processor and a memory for executing a node that runs a distributed instance of a blockchain) for the status of a monitored transaction and provides the status to the state monitor cache 115. In some embodiments the state monitor 117 may be configured to run geographically near (or on the same machine and/or compute device) as a specific blockchain node 119. The state monitor 117 may also write the state changes to the state monitor cache 115.

In some embodiments, the state monitor 117 may query the blockchain node 119 at any suitable interval, including, but not limited to, once per second. As discussed above, in some implementations, the state monitor 117 can be configured to periodically (e.g., at predefined intervals), sporadically, randomly and/or on-demand (e.g., in response to receiving a query request from the dispatch server 109), query and/or interrogate the blockchain (or blockchain node 119) for the status of the blockchain transaction. In some implementations, the state monitor 117 can subscribe to receive messages and/or status updates from the blockchain (or blockchain node 119). In such implementations, the state monitor can register with the blockchain node to passively receive messages and/or status updates associated with a blockchain transaction's state. For example, the state monitor 117 can register with the blockchain node 119 to receive updates when the status of one or more identified blockchain transactions changes. When an update occurs to one of the monitored blockchain transactions, the blockchain node 119 can send an update of the new status to the state monitor 117, which can then store an indication of the update in the state monitor cache 115 for access by the dispatch server 109.

In some embodiments, the state monitor 117 may be configured to determine whether a user is ready and/or able to send a transaction. For example, blockchain interactions typically include a transaction fee (sometimes referred to as "gas") that governs the transaction processing time (or whether it will be processed at all). In some embodiments, the state monitor 117 may be used to monitor current gas prices and transaction completion rates and advise user and Dapp developers on appropriate gas prices to achieve the desired and/or optimal transaction processing times and completion rates. For example, when monitoring transactions, the state monitor 117 can store, identify and/or keep track of data relevant to processing times and completion rates associated with the blockchain. The state monitor 117 can then provide such information to the state monitor cache 115 and/or the dispatch server 109 such that the dispatch server 109 can provide information on the transaction fees needed to obtain a desired processing time and/or completion rate for a transaction in that blockchain. Similarly stated, the dispatch server 109 can receive, from the state monitor 117, an indication of a transaction fee to achieve a desired processing time for confirming a blockchain transaction.

In some embodiments, the state monitor 117 may operate in a manner such that it does not interfere or intercede with the Dapp normal interaction with the blockchain. For example, if a server is unavailable, the client library is configured such that it doesn't impede normal Dapp usage, including transaction processing.

Accordingly, in some embodiments, the dispatch server 109 may not connect to the blockchain 119 directly, rather it is able to receive data via the state monitor cache 115 which is capable of receiving state information from a plurality of state monitors 117 and each state monitor's respective blockchain. Accordingly, the dispatch server 109 may be capable of receiving data and information regarding various blockchains, and does not need to be tied to a specific blockchain implementation.

Additionally, as illustrated in FIG. 1, the dispatch server 109 may be communicatively coupled to an event store 111 (e.g., a memory) that is configured to store event information (i.e., status changes). Further the event store 111 may be communicatively coupled to one or more systems (e.g., compute devices having processors and memories) for reporting 113 the event information to a user or distributed application developer (e.g., tables, spreadsheets, data visualization software, etc.).

The components shown and described with respect to FIG. 1 can be communicatively coupled to each other (and as shown in FIG. 1) via any suitable communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

Figure 2:
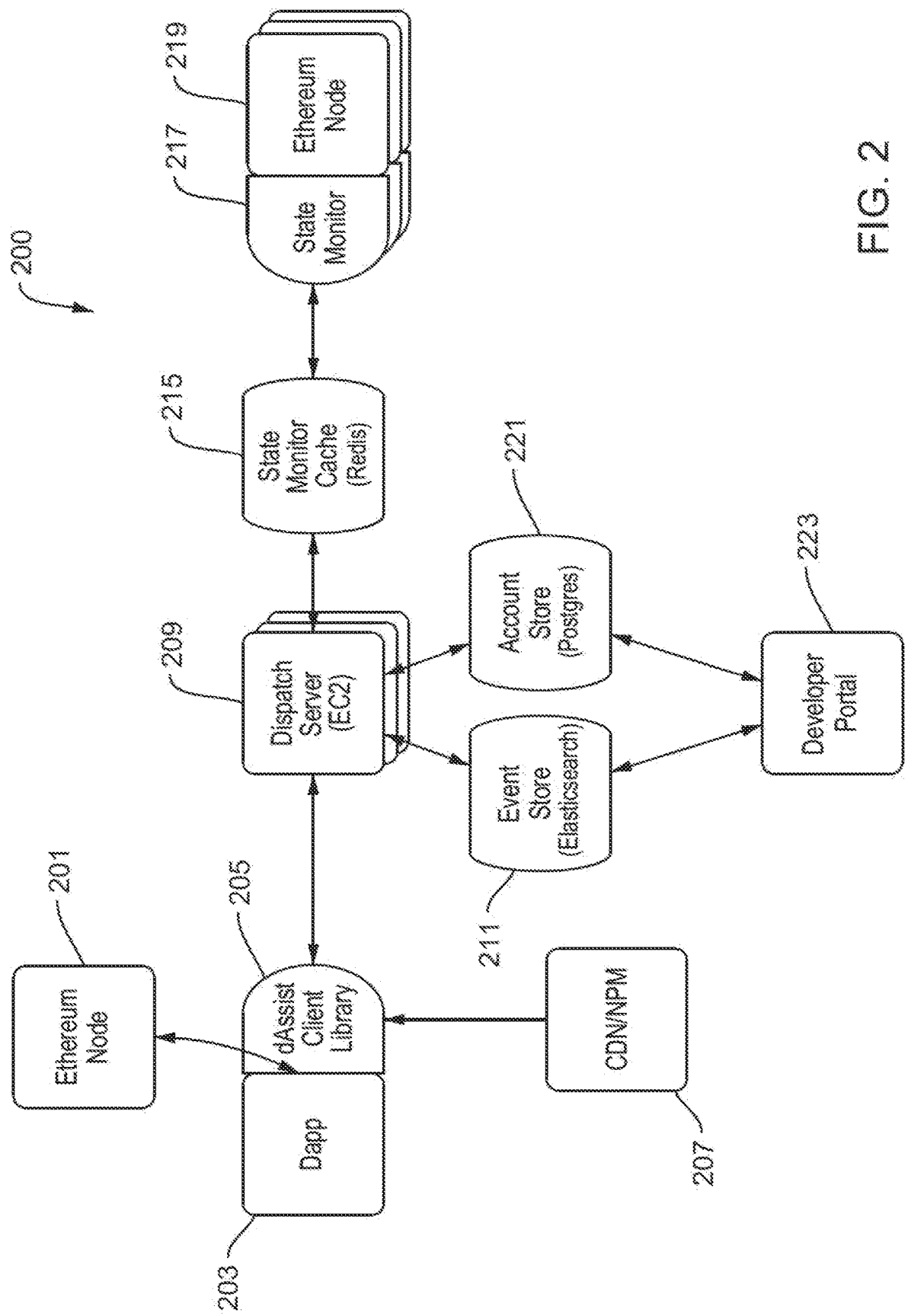
FIG. 2 illustrates an architecture diagram for a system in accordance with some embodiments of the present disclosure.

FIG. 2 illustrates an architecture diagram for a system in accordance with some embodiments of the present disclosure. As illustrated, the system architecture 200 of FIG. 2, provides additional resiliency as compared to the system architecture 100 of FIG. 1. In particular, the multiple services including the dispatch server 209 (functionally and/or structurally similar to the dispatch server 109 of FIG. 1) and state monitor 217 (functionally and/or structurally similar to the state monitor 217 of FIG. 1) are replicated. Additionally, multiple blockchain nodes 219 (functionally and/or structurally similar to the blockchain node 119 of FIG. 1) are connected to the state monitor(s) 217. Accordingly, the replicated systems such as the dispatch server 209, state monitor 217, and/or the blockchain nodes 219 are load balanced to ensure service availability and low latency.

Similar to the components of FIG. 1, a system architecture 200 may include a blockchain node 201 (functionally and/or structurally similar to the blockchain node 101) in communication with a distributed application 203 that interfaces with a client library 205 (e.g., a memory) that is communicatively coupled to a content delivery network and/or package manager (CDN/NPM) 207. A distributed application 203 and related client library 205 may interface with one or more dispatch servers, each of which is configured to interface with a state monitor cache 215 (structurally and/or functionally similar to state monitor cache 115 of FIG. 1), that in turn may be communicatively coupled to one or more state monitors 217 and their respective blockchain node 219. Further, the dispatch server 209 may be communicatively coupled to an event store 211 (e.g., memory) configured store and visualize status changes, and an account store 221 (e.g., memory) configured for database management. Data and information from the event store 211 and/or the account store 221 may be provided to a developer portal 223 executing on a server and/or compute device that is configured to provide a distributed application developer with a portal for data analytics. The developer portal 223 may support account management and analytics dashboard features. Account management may allow developers to receive and follow metrics such as time-series data, and/or aggregate metrics data. Similar to system 100 of FIG. 1, the components shown and described with respect to FIG. 2 can be communicatively coupled to each other (and as shown in FIG. 2) via any suitable communication network.

Figure 3:
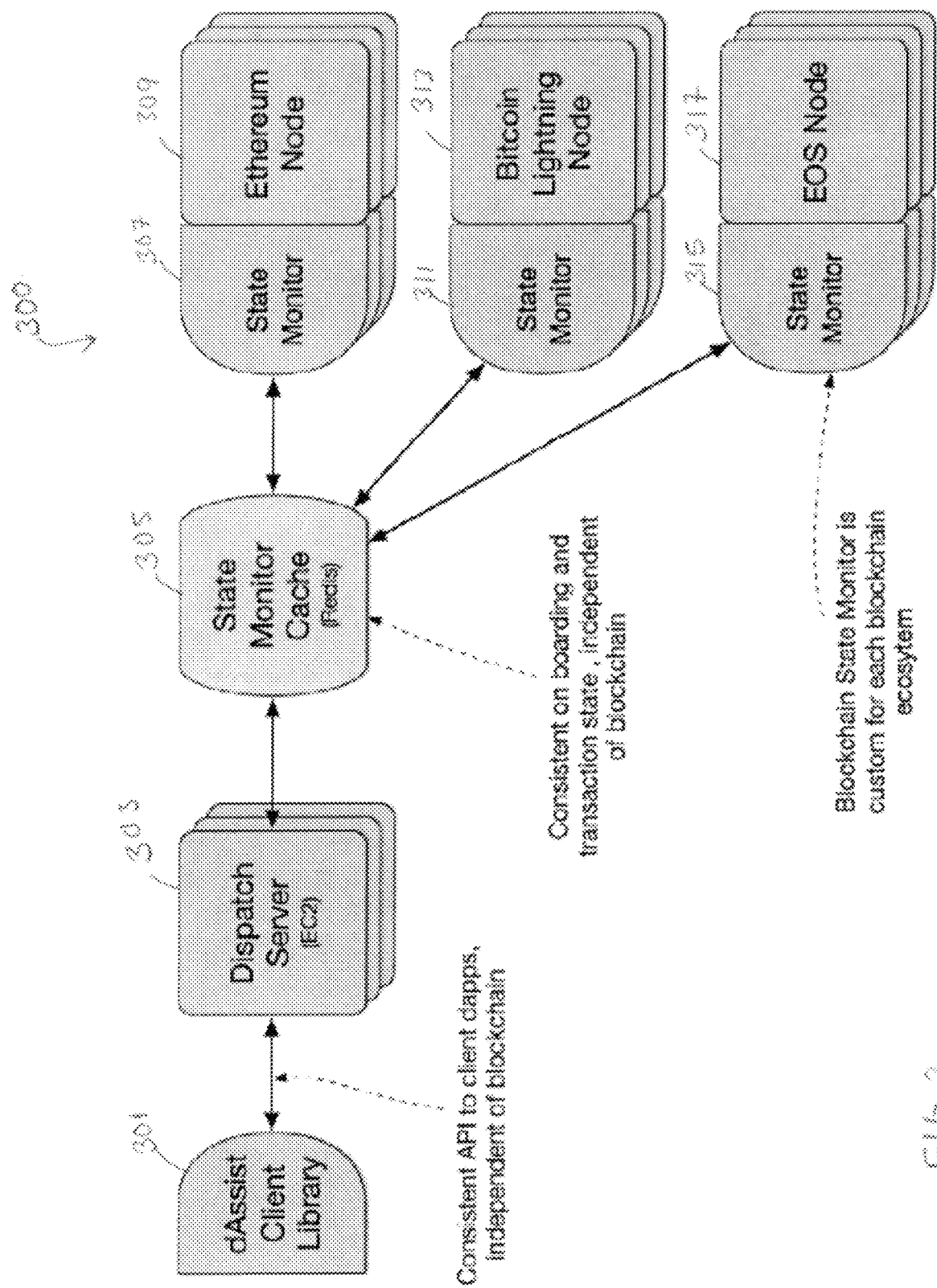
FIG. 3 illustrates an architecture diagram for a system in accordance with some embodiments of the present disclosure.

FIG. 3 illustrates an architecture diagram for a computer architecture system 300 in accordance with some embodiments of the present disclosure. As illustrated in FIG. 3, a state monitor cache 305 (functionally and/or structurally similar to the state monitor cache 105 of FIG. 1) may be configured to interact with various state monitors 307, 311, 315 (functionally and/or structurally similar to the state monitor 117 of FIG. 1), each of which may be configured for engaging with a particular distributed blockchain network (e.g., Ethereum, Bitcoin, Lightning, EOS). As illustrated in FIG. 3, the dispatch server 303 (functionally and/or structurally similar to the dispatch server 109 of FIG. 1) may provide a consistent application programming interface to the distributed application 301 independent of the blockchain. Additionally, the state monitor cache 305 may provide a consistent on-boarding and transaction state monitoring, also independently of the blockchain. Similar to system 100 of FIG. 1, the components shown and described with respect to FIG. 3 can be communicatively coupled to each other (and as shown in FIG. 3) via any suitable communication network.

Figure 4:
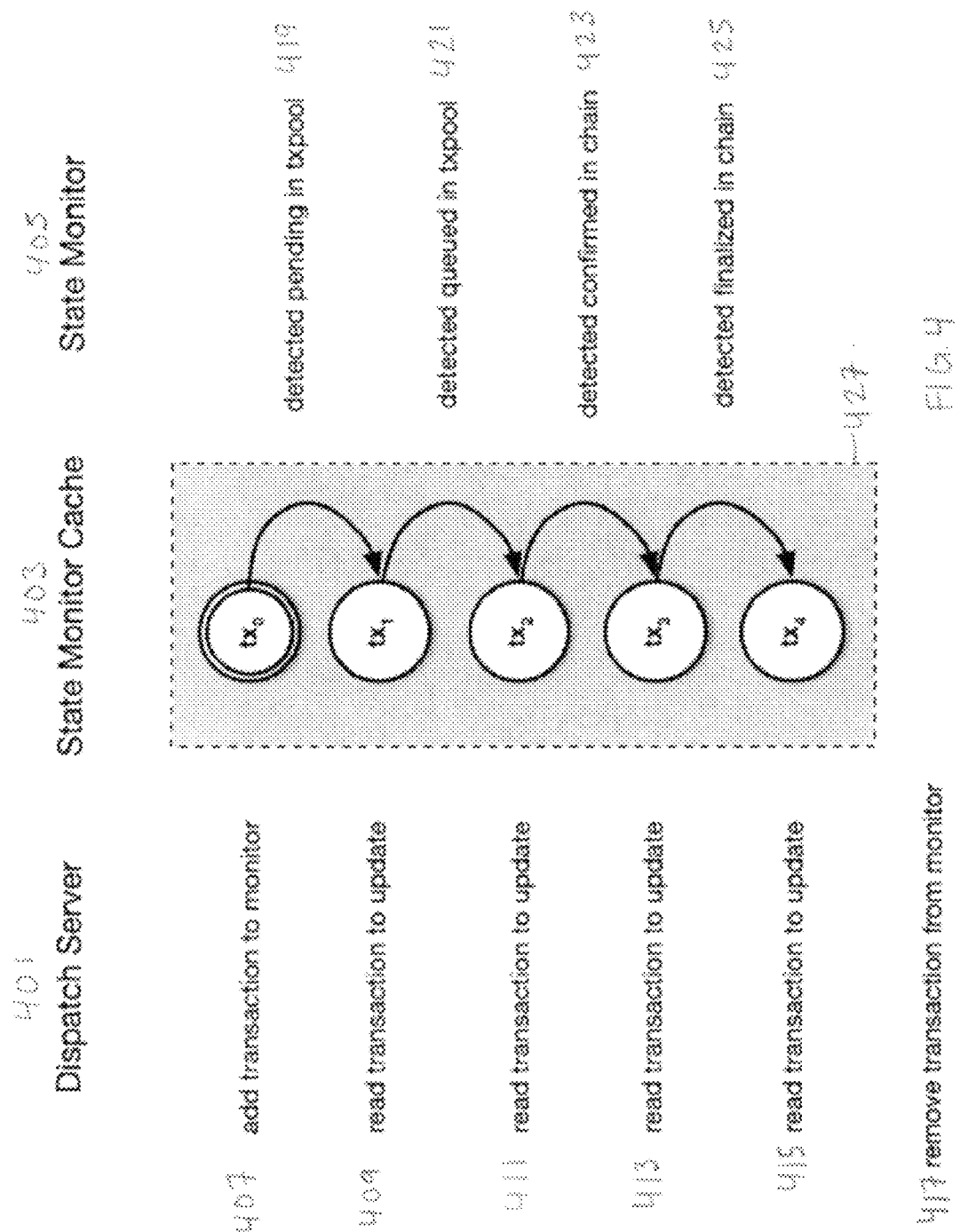
FIG. 4 illustrates a flow diagram for a system in accordance with some embodiments of the present disclosure.

FIG. 4 illustrates a flow diagram for a system in accordance with some embodiments of the present disclosure. Illustrated in FIG. 4 are interactions between dispatch server 401 (functionally and/or structurally similar to the dispatch server 109 of FIG. 1), state monitor cache 403 (functionally and/or structurally similar to the state monitor cache 115 of FIG. 1), and state monitor 405 (functionally and/or structurally similar to the state monitor 117 of FIG. 1). In a first step 407, the dispatch server adds the transaction to the state monitor cache 403. The state monitor cache 403 updates the status of the transaction as it moves from being submitted, to being finalized and/or finalized in the blockchain 427. For example, the state monitor 405 tracks a particular transaction as it is detected pending in a pool 419, then is queued in the pool 421, finalized in the chain 423, and then finalized in the chain 425. Throughout this time, the dispatch server may read the state monitor cache 403 (illustrated as steps 409, 411, 413, and 415) in order to receive updates regarding the transaction. After the state monitor cache 403 indicates that a particular transaction is finalized in the chain 425, the dispatch server 401 may then remove transaction from the monitor 417.

Accordingly, in some embodiments, in addition to monitoring the status of transactions on the blockchain the state monitor 117 may be capable of monitoring in-memory pending and queued transactions and provide more immediate notification of the status of transactions to a user.

Figure 5:
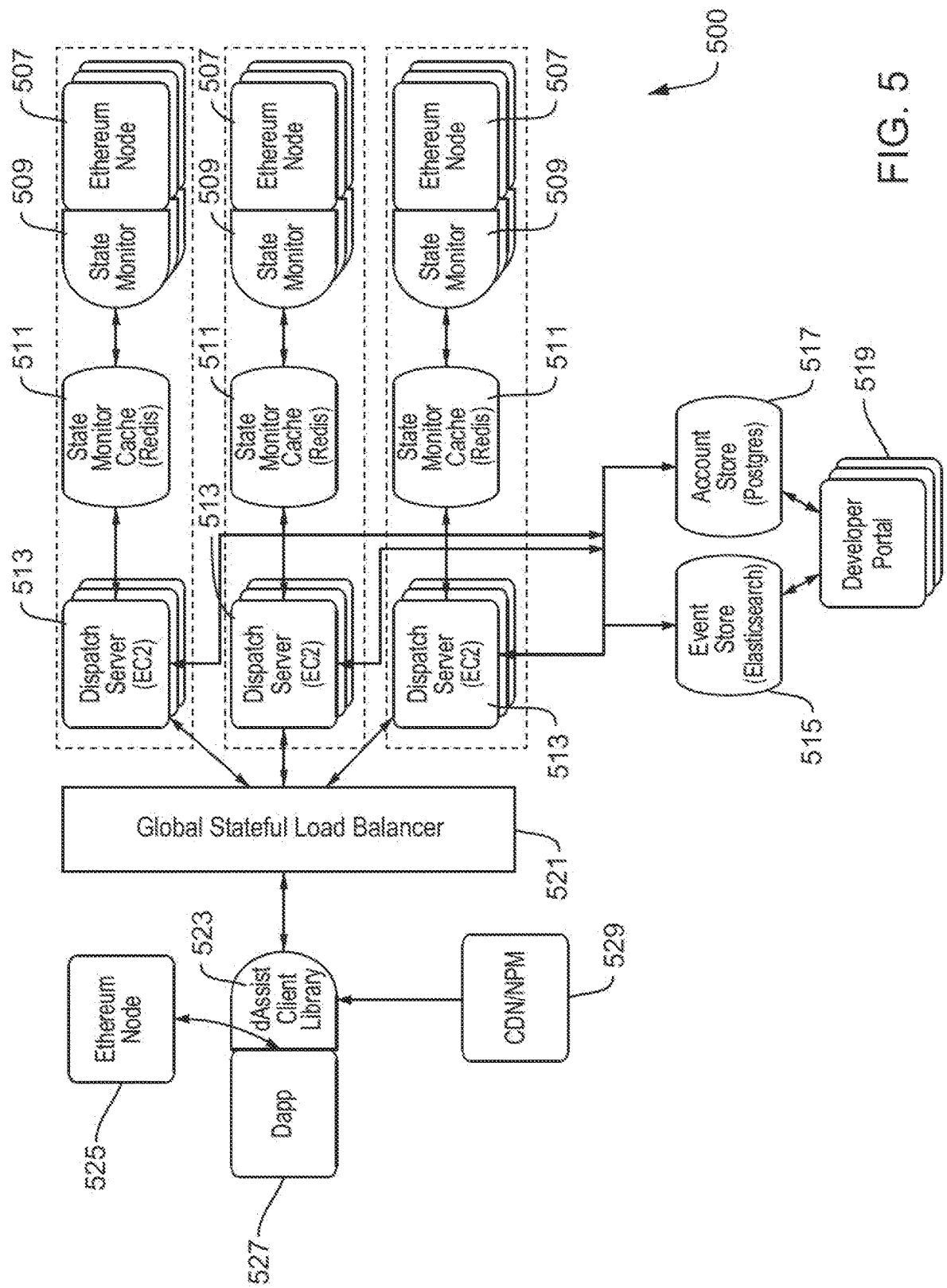
FIG. 5 illustrates an architecture diagram for a system in accordance with some embodiments of the present disclosure.

FIG. 5 illustrates an architecture diagram for a computer architecture system 500 in accordance with some embodiments of the present disclosure. In the embodiment of FIG. 5, the computer architecture system 500 is organized for low-latency global access. In particular, the backend components 501, 503, 505 which include dispatch server(s) 513 (functionally and/or structurally similar to the dispatch server 109 of FIG. 1), state monitor cache(s) 511 (functionally and/or structurally similar to the state monitor cache 115 of FIG. 1), state monitor(s) 509 (functionally and/or structurally similar to the state monitor 117 of FIG. 1), and blockchain node(s) 507 (functionally and/or structurally similar to the blockchain node 101 of FIG. 1) of the disclosed system are replicated across geographic regions. The backend components may interface with a global stateful load balancer 521 (e.g., executing on a compute device) that is configured to send traffic from the distributed application 527 coupled to blockchain node 525 to the nearest dispatch server cluster via the client library 523. As previously discussed, each dispatch server may interface with an event store 515 (e.g., memory) and/or account store 517 (e.g., memory), either of both of which may provide data to a developer portal 519.

Accordingly, the computer architecture system illustrated in FIG. 5 may allow for the monitoring of blockchain nodes 507 located in geographically disparate areas. As illustrated in FIG. 5, the developer portal 519 (e.g., executing on a server and accessible by a compute device) may remain as a single component, however the developer portal 519 may be configured to be capable of receiving blockchain information from geographically distributed backend components. Further, the computer architecture system illustrated in FIG. 5 may allow the monitoring of transaction latency (i.e., the time required to accomplish each step in FIG. 4) and allow for the system to advise a Dapp user when transactions may complete, and advise a Dapp developer on which components of the system may require improved performance. Similar to system 100 of FIG. 1, the components shown and described with respect to FIG. 5 can be communicatively coupled to each other (and as shown in FIG. 5) via any suitable communication network.

Figure 6:
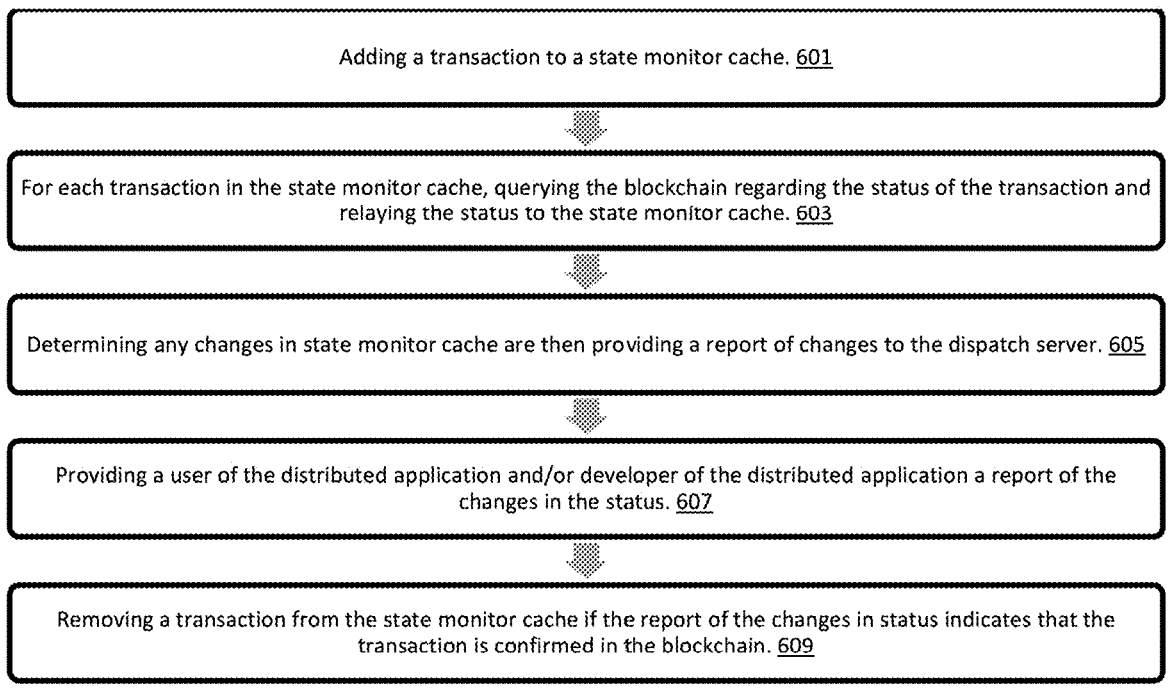
FIG. 6 illustrates a method in accordance with some embodiments of the present disclosure.

FIG. 6 illustrates a method in accordance with some embodiments of the present disclosure. In a first step 601, a dispatch server adds a transaction to a state monitor cache. In a second step 603, for each transaction in the state monitor cache, the state monitor queries the blockchain regarding the status of the transaction and the status is relayed to the state monitor cache. In a next step 605, any changes in state monitor cache are determined and then provided to the dispatch server. Further the timing between each step of the process may be tracked for time of day/week and seasonal analysis. In a next step 607, the dispatch server may provide a user of the distributed application and/or developer of the distributed application a report of the changes in the status. Additionally, in a step 609, the dispatch server may remove a transaction from the state monitor cache if the report of the changes in status indicates that the transaction is finalized in the blockchain.

As discussed above, in some embodiments, the dispatch server may provide an event code corresponding to the status of a transaction or a transaction's interaction with the blockchain. The client library may then be used to convert the event code into meaningful data that can be provided to a user of the distributed application. Meaningful data may be Dapp specific, for example, the meaningful data may use the specific context of the Dapp to interpret messages from the server on transaction progress.

Figure 7B:
FIG. 7 illustrates a diagram for an aspect of a system in accordance with some embodiments of the present disclosure.

FIG. 7 illustrates a table that represents vocabulary for setup on-boarding and transaction processing events that is independent of any specific blockchain. As illustrated, the table includes common library categories 701, events 703, category codes 705, and event codes 707, that may assist in converting event code into plain language, meaningful data that is provided to a user of the distributed application. Example categories 701 include initiation 701, on-boarding 711, preflight active transactions 713, monitoring active transactions 715, and monitoring passive transactions 717.

In some embodiments, the dispatch server may communicate with the distributed application via an application programming interface, and a websocket connection. In some embodiments, data may be transmitted in JavaScript® Object Notation (JSON) and the like.

Figure 8A:
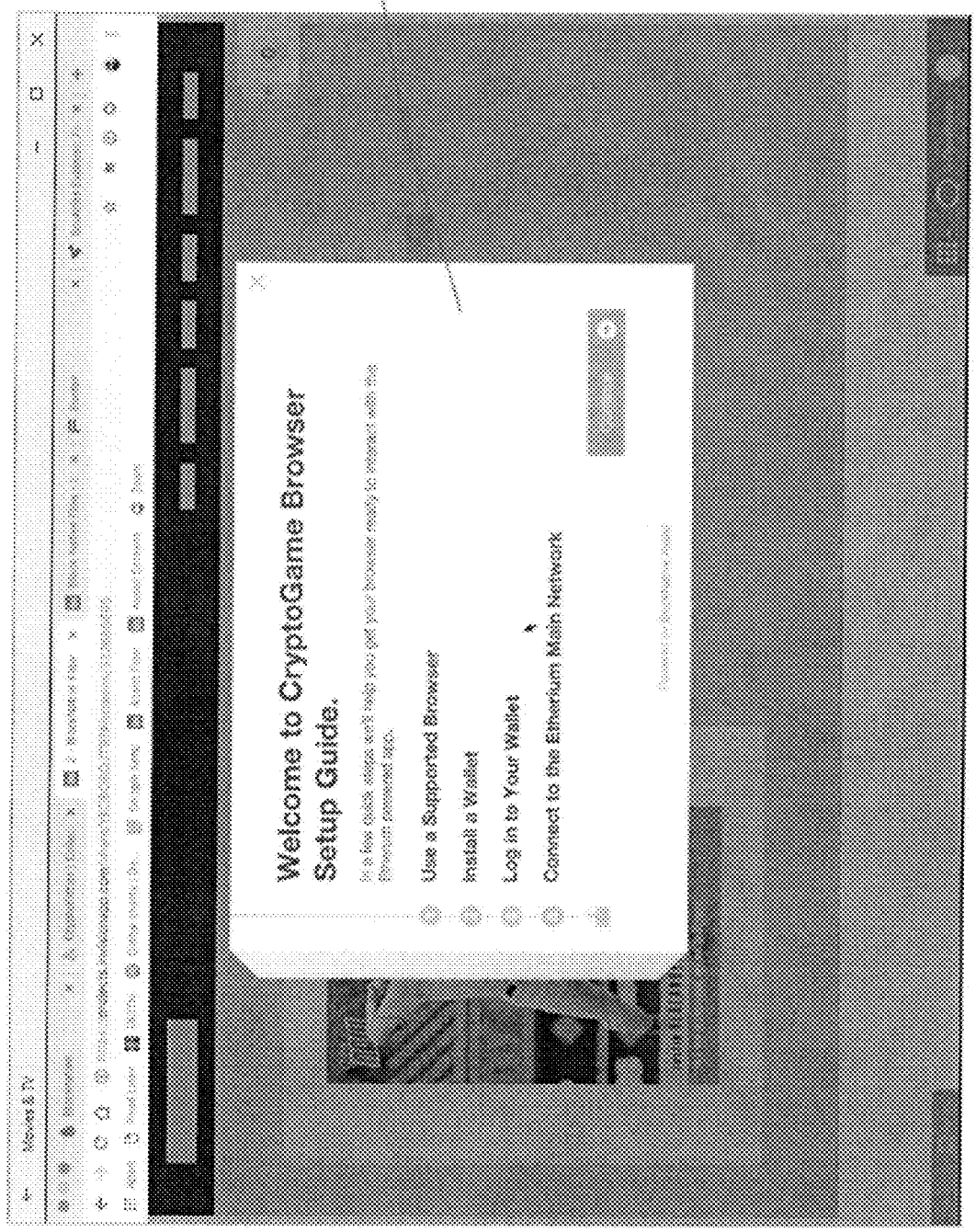
FIGS. 8A-8N illustrate screenshots for a system built in accordance with some embodiments of the present disclosure.

FIGS. 8A-8N illustrate screenshots for a system built in accordance with some embodiments of the present disclosure. In the illustrated embodiments, the systems and methods described herein are embodied as a Javascript library included with the Dapp.

Figure 8C:
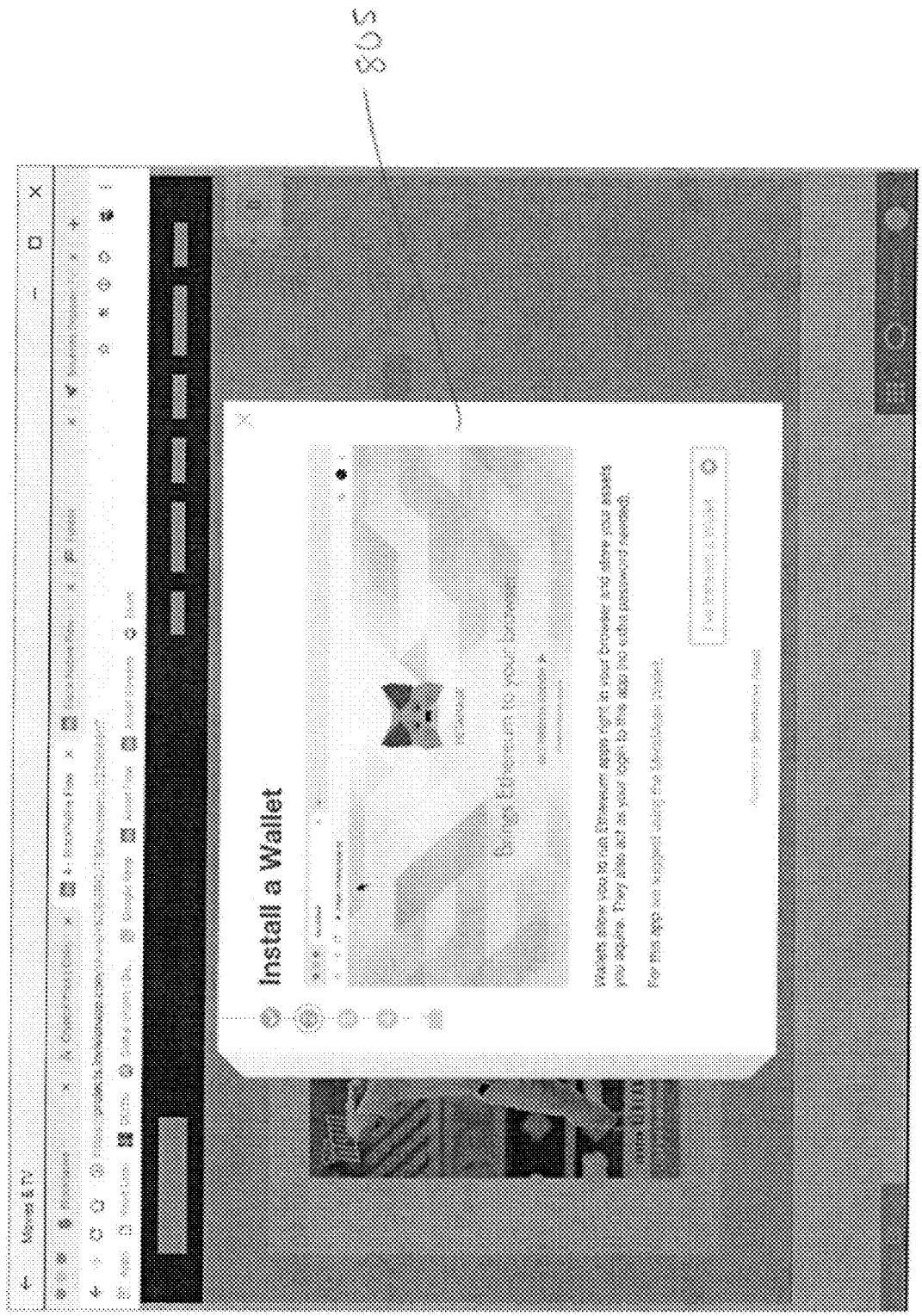
Figure 8F:
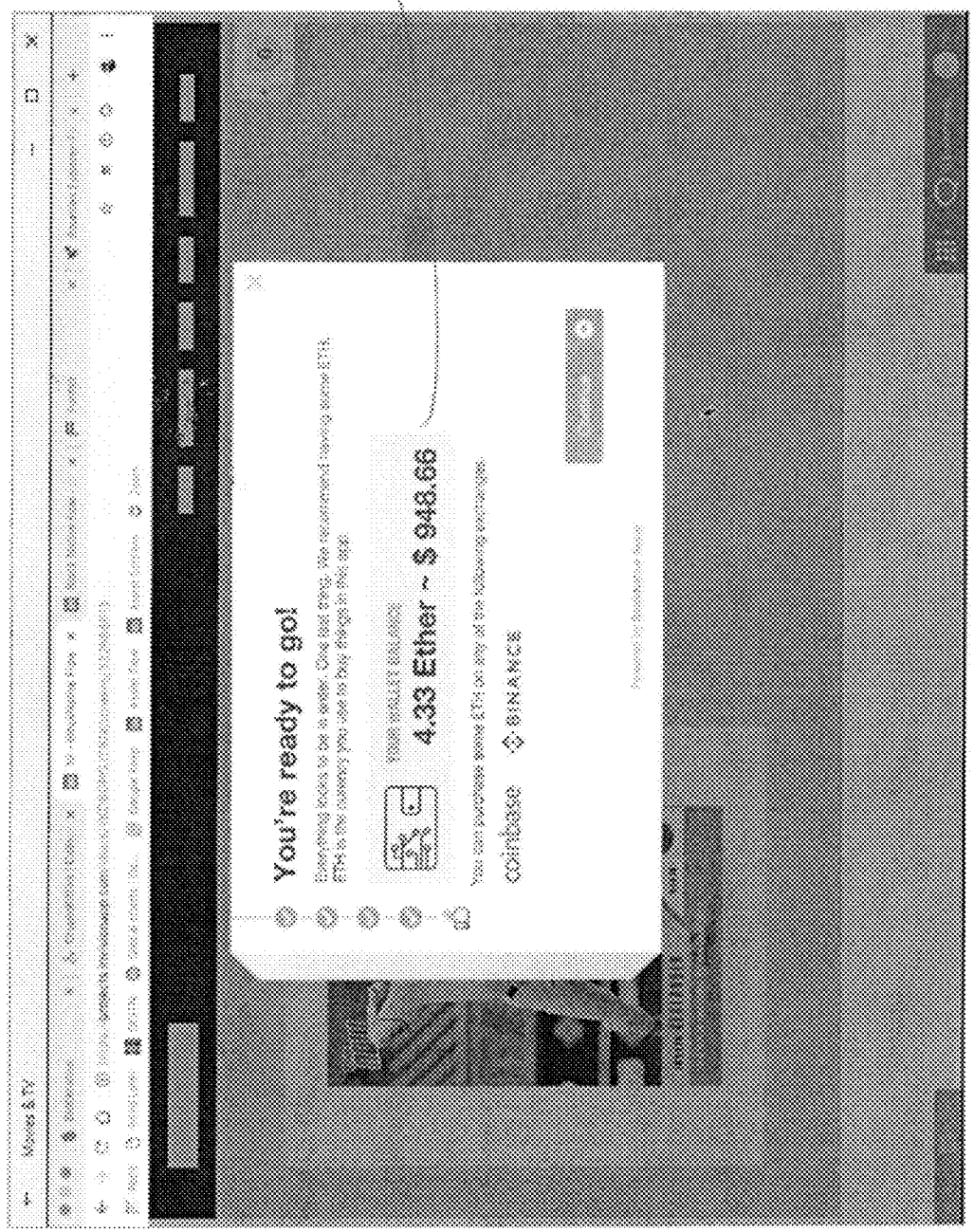

As illustrated, the Javascript library (FIG. 8A) may provide a user of the distributed application with instructions on a homescreen 801 for successfully interacting with a blockchain including for how to use a supported browser 803 (FIG. 8B), install a wallet 805 (FIG. 8C), log in to a wallet 807 (FIG. 8D), and connect to a blockchain 809 (FIG. 8E). The web browser plug-in may provide a user with an indication of their cryptocurrency balance 811 (FIG. 8F).

Figure 8G:
Figure 18:
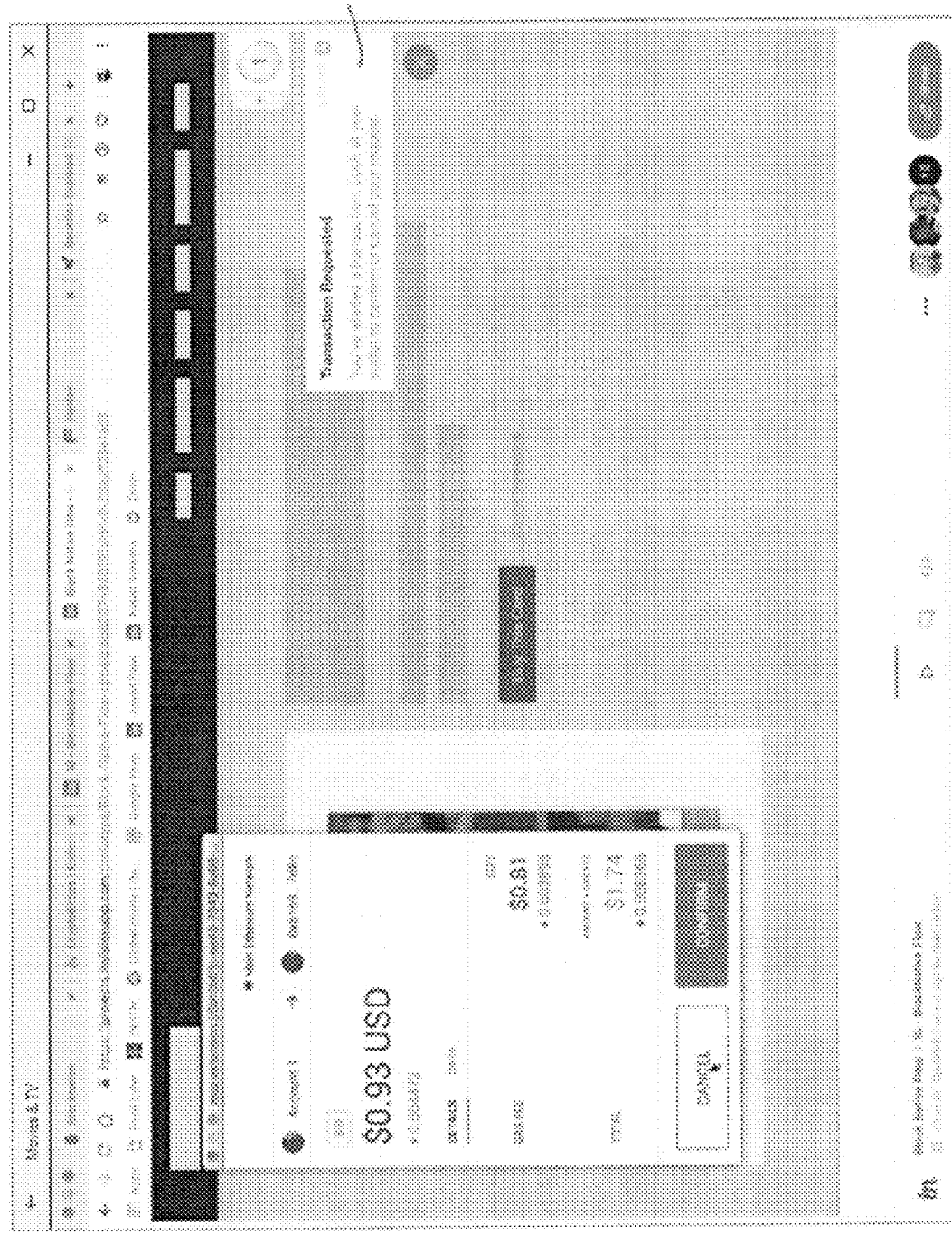
Figure 8K:
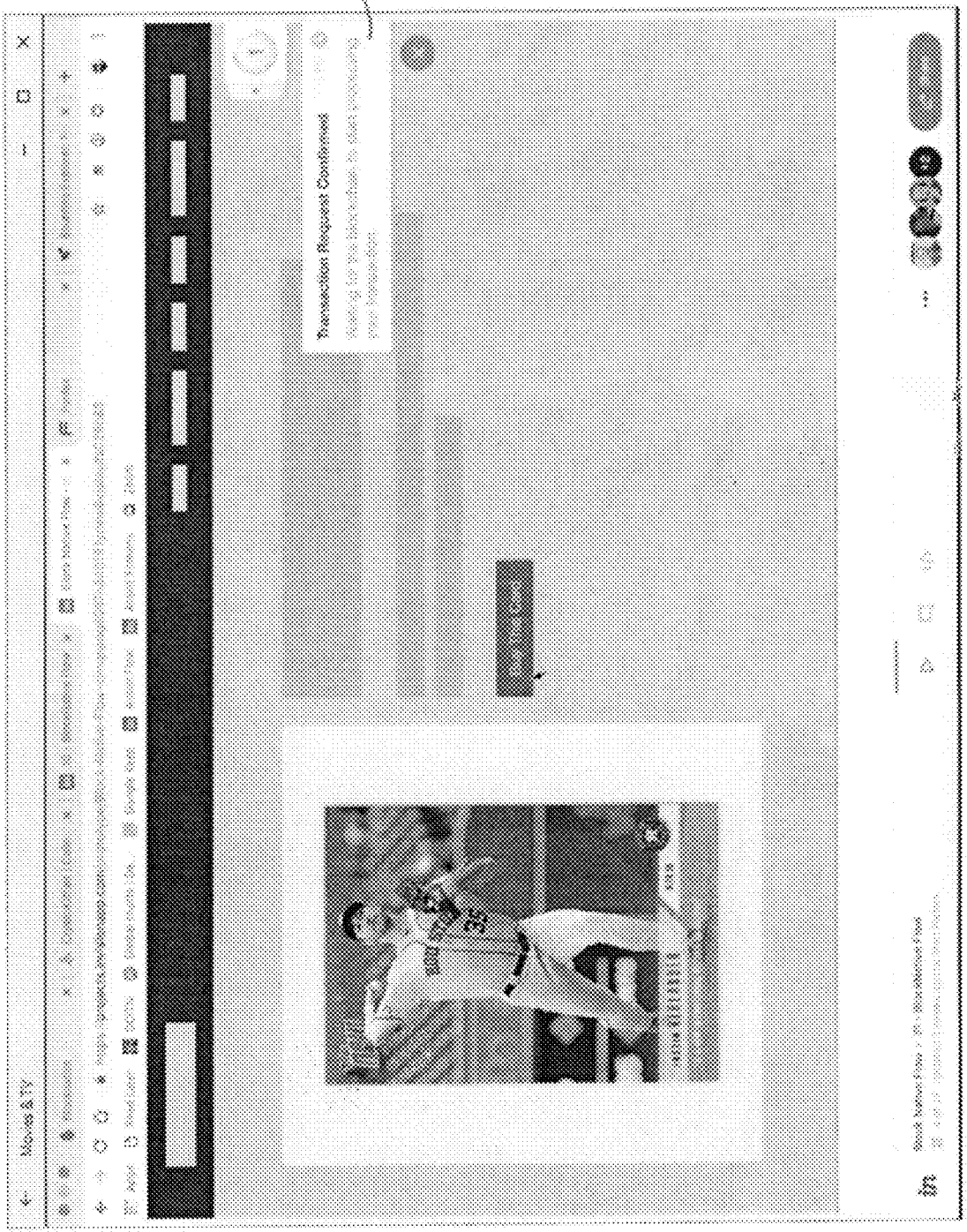

In the illustrated example, a distributed application may be configured such that a user can purchase a baseball card 813 (FIG. 8G). The web browser plug-in may provide updates regarding the user's interaction with the distributed application. For example, Javascript library may notify the user of insufficient balances 815 (FIG. 8H) if they click to initiate a transaction but do not have enough available funds. The Javascript library may also provide instructions to a user when they want to interact with the blockchain 817 (FIG. 8I). The disclosed systems and methods may also provide background information and/or status updates regarding the blockchain including (without limitation): Awaiting Transaction Confirmation 819 (FIG. 8J), Transaction Request Confirmed 821 (FIG. 8K), Transaction in Progress 823, 825, 827 (FIGS. 8L and 8M), and Transaction Successful 829 (FIG. 8M). Further, the disclosed systems and methods may provide a historical record 831 of previous interactions between the user, the distributed application(s), and the blockchain (FIG. 8N).

In some embodiments, notifications provided to the user may be customizable by a Dapp developer such that the notifications are specifically configured to make the Dapp easier for a user to use.

FIG. 9 illustrates a computer system in accordance with some embodiments of the present disclosure. FIG. 9 illustrates a functional block diagram of a machine in the example form of computer system 900, within which a set of instructions for causing the machine to perform any one or more of the methodologies, processes or functions discussed herein may be executed. For example, the components of the systems 100, 200, 300, and 500 described herein, such as the dispatch server, state monitor cache, state monitor, blockchain nodes, etc. can be structurally similar to the compute system 900. For example, code including instructions to cause a processing device (e.g., processing device 903) to execute the functions described herein with respect to such components can be stored in a memory (e.g., memory 907).

In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein.

Example computer system 900 may include processing device 903, memory 907, data storage device 909 and communication interface 915, which may communicate with each other via data and control bus 901. In some examples, computer system 900 may also include display device 913 and/or user interface 911.

Processing device 903 may include, without being limited to, a microprocessor, a central processing unit, an application specific integrated circuit (ASIC), a field programmable gate array (FPGA), a digital signal processor (DSP) and/or a network processor. Processing device 903 may be configured to execute processing logic 905 for performing the operations described herein. In general, processing device 903 may include any suitable special-purpose processing device specially programmed with processing logic 905 to perform the operations described herein.

Memory 907 may include, for example, without being limited to, at least one of a read-only memory (ROM), a random access memory (RAM), a flash memory, a dynamic RAM (DRAM) and a static RAM (SRAM), storing computer-readable instructions 917 executable by processing device 903. In general, memory 907 may include any suitable non-transitory computer readable storage medium storing computer-readable instructions 917 executable by processing device 903 for performing the operations described herein. Although one memory device 907 is illustrated in FIG. 9, in some examples, computer system 900 may include two or more memory devices (e.g., dynamic memory and static memory).

Computer system 900 may include communication interface device 911, for direct communication with other computers (including wired and/or wireless communication), and/or for communication with network. In some examples, computer system 900 may include display device 913 (e.g., a liquid crystal display (LCD), a touch sensitive display, etc.). In some examples, computer system 900 may include user interface 911 (e.g., an alphanumeric input device, a cursor control device, etc.).

In some examples, computer system 900 may include data storage device 909 storing instructions (e.g., software) for performing any one or more of the functions described herein. Data storage device 909 may include any suitable non-transitory computer-readable storage medium, including, without being limited to, solid-state memories, optical media and magnetic media.

While described herein as separate components and/or devices, in some embodiments, the components of the systems 100, 200, 300 and 500 described herein can be executed on any number of devices. For example, the dispatch server 109 and the state monitor cache 115 of FIG. 1 can be executed in separate physical devices or within a single physical device. For another example, the state monitor 117 can be executed on the same device as the blockchain node 119 or on a device separate from the blockchain node 119. In other instances, any other components can be combined and/or executed on the same or separate device(s).

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

In this disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or example language ("e.g.," "such as," "including," or the like) provided herein, is intended merely to better illuminate the embodiments and does not pose a limitation on the scope of the embodiments or the claims.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, Software applications or code) include machine instructions for a programmable processor, and may be implemented in a high-level procedural and/or object-oriented programming language, and/or in assembly/machine language. As used herein, the terms "machine-readable medium", "computer-readable medium" and "processor-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or frontend components. The components of the system may be interconnected by any form or medium of digital data communication (e.g., a communication network). Examples of communication networks include a local area network ("LAN"), a wide area network ("WAN"), and the Internet. The computing system may include clients and servers. A client and server are generally remote from each other and typically interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Although the present disclosure may provide a sequence of steps, it is understood that in some embodiments, additional steps may be added, described steps may be omitted, and the like. Additionally, the described sequence of steps may be performed in any suitable order.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the example systems may be modified.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

We claim:

1. An apparatus, comprising:
   a memory of a dispatch server; and
   a processor of the dispatch server communicatively coupled to the memory, the processor configured to detect a blockchain transaction specific to a distributed application (Dapp) and in a pool of pending blockchain transactions, the blockchain transactions in the pool of pending blockchain transactions having not yet been finalized in a blockchain,
   the processor configured to store an indication of the blockchain transaction in a state monitor cache communicatively coupled to a state monitor installed at a node of the blockchain such that the state monitor queries the blockchain for a status of the blockchain transaction based on the indication of the blockchain transaction being stored within the state monitor cache,
   the processor configured to receive, from the state monitor at the node of the blockchain, an event code associated with a transition of the blockchain transaction from a first state to a second state,
   the processor configured to calculate a transaction latency based on the event code, the transaction latency including a time taken for the transaction to be (1) added to the state monitor cache, (2) detected as pending in the pool of pending blockchain transactions by the state monitor, (3) detected as queued in the pool of pending blockchain transactions by the state monitor, (4) detected as confirmed in the blockchain by the state monitor, and (5) detected as finalized in the blockchain by the state monitor,
   the processor configured to provide an indication of the transaction latency and the event code to the Dapp such that the Dapp converts the event code into a specific context of the Dapp,
   the processor configured to calculate, based on information received from the state monitor, a transaction fee to achieve a desired processing time for finalizing the blockchain transaction in the blockchain,
   the processor configured to remove the indication of the blockchain transaction from the state monitor cache in response to the event code indicating that the blockchain transaction is finalized in the blockchain.

2. The apparatus of claim 1, wherein the state monitor is configured to periodically query the blockchain for the status of the blockchain transaction.

3. The apparatus of claim 1, wherein the state monitor is from a plurality of state monitors and the blockchain is from a plurality of blockchains, each state monitor from the plurality of state monitors being associated with a different blockchain from the plurality of blockchains,
   the processor configured to receive status updates associated with transactions in each blockchain from the plurality of blockchains via the state monitor associated with that blockchain and via the state monitor cache.

4. The apparatus of claim 3, wherein each state monitor from the plurality of state monitors is located in a geographically disparate area from the remaining state monitors from the plurality of state monitors.

5. The apparatus of claim 3, wherein each state monitor is located geographically near to a node of the blockchain associated with that state monitor.

6. The apparatus of claim 1, wherein the transaction latency is the time required to accomplish the transition from the first state to the second state.

7. The apparatus of claim 1, wherein the transaction latency further includes a time taken for the transaction to be removed from the state monitor cache by the dispatch server.

8. The apparatus of claim 1, wherein the state monitor is configured to periodically, sporadically, randomly or on-demand query the blockchain for the status of the blockchain transaction.

9. The apparatus of claim 1, wherein the state monitor is configured to subscribe to receive the status of the blockchain transaction.

10. The apparatus of claim 1, wherein the state monitor is configured to register with the blockchain to passively receive the status of the blockchain transaction.

11. The apparatus of claim 1, wherein the transaction latency is tracked for at least one of a time of day, a time of week, or seasonally.

12. The apparatus of claim 1, wherein the state monitor is configured to periodically query the blockchain every second.

13. The apparatus of claim 1, wherein the Dapp converts the event code into the specific context of the Dapp associated with the transaction latency such that a user is advised when transactions will complete based on the transaction latency.

14. The apparatus of claim 1, wherein the Dapp converts the event code into the specific context of the Dapp associated with the transaction latency such that a user is advised of at least one component associated with the Dapp to be improved based on the transaction latency.

15. A method, comprising:
   detecting a blockchain transaction specific to a distributed application (Dapp) and in a pool of pending blockchain transactions, the blockchain transactions in the pool of pending blockchain transactions having not yet been finalized in a blockchain;
   storing an indication of the blockchain transaction in a state monitor cache communicatively coupled to a state monitor installed at a node of the blockchain such that the state monitor queries the blockchain for a status of the blockchain transaction based on the indication of the blockchain transaction being stored within the state monitor cache;
   receiving, from the state monitor at the node of the blockchain, an event code associated with a transition of the blockchain transaction from a first state to a second state;
   providing the event code and a transaction latency calculated based on the event code to the Dapp such that the Dapp converts the event code into a specific context of the Dapp, the transaction latency including a time taken for the transaction to be (1) added to the state monitor cache, (2) detected as pending in the pool of pending blockchain transactions by the state monitor, (3) detected as queued in the pool of pending blockchain transactions by the state monitor, (4) detected as confirmed in the blockchain by the state monitor, and (5) detected as finalized in the blockchain by the state monitor;

calculating, based on information received from the state monitor, a transaction fee to achieve a desired processing time for finalizing the blockchain transaction in the blockchain;

providing an indication of the specific context of the Dapp and the transaction fee to a user of the Dapp; and removing the indication of the blockchain transaction from the state monitor cache in response to the event code indicating that the blockchain transaction is finalized in the blockchain.

16. The method of claim 15, wherein the state monitor is from a plurality of state monitors associated with the state monitor cache and the blockchain is from a plurality of blockchains, each state monitor from the plurality of state monitors is associated with a different blockchain from the plurality of blockchains.

17. The method of claim 15, wherein the state monitor is configured to periodically, sporadically, randomly or on-demand query the blockchain for the status of the blockchain transaction.

18. The method of claim 15, wherein the transaction latency further includes a time taken for the transaction to be removed from the state monitor cache by the dispatch server.

19. The method of claim 15, wherein the Dapp converts the event code into the specific context of the Dapp associated with the transaction latency such that the user is advised when transactions will complete based on the transaction latency.

20. The method of claim 15, wherein the Dapp converts the event code into the specific context of the Dapp associated with the transaction latency such that the user is advised of at least one component associated with the Dapp to be improved based on the transaction latency.

* * * * *